Patented July 7, 1931

1,812,885

UNITED STATES PATENT OFFICE

GEORGE A. LIPPINCOTT, OF PHILADELPHIA, PENNSYLVANIA

PROCESS OF TREATING NACREOUS SUBSTANCES AND ARTICLES FORMED THEREFROM

No Drawing.    Application filed September 21, 1927.  Serial No. 221,130.

This invention relates to the treatment of pearl, mother of pearl shell, nacre and the shells of mollusks in general.

Microscopic tests reveal that these formations comprise layers of small wafer-like unicellular crystals of calcium carbonate each possessing a pearly luster and iridescence, the beauty of which is well recognized in the complete object.

Such analyses also disclose the presence of an organic material distributed throughout the mass and which has the function of a binder for uniting the crystals and maintaining their arrangement in a mosaic-like manner. This natural binder is a horny, organic substance having the general properties of an albuminoid and is known as conchilin or conchiolin.

The problem with which I am concerned is the recovery of the uni-cellular crystals and layers in the form of flakes possessed of their inherent qualities of iridescence and pearly lustre. Experiments have shown quite conclusively that the presence of the organic substance or binder has the effect of discoloring the flaked material prepared in accordance with previous methods, marring the brilliance of the final product and impairing its value.

For example where the crushed shell is subjected to heat in an oven for the purposes of exfoliation and to permit easier flaking, the conchiolin shrinks by virtue of the evaporation of its small moisture content and the recovered flakes are yellowed or blackened due to cooking, charring or carbonizing of the organic matter upon the flakes. Such flakes do not have their natural polish and for most purposes are worthless.

It is, therefore, the principal object of my invention to recover the flakes with their full lustre and beauty, and substantially free from the organic matter or with but slight adhering traces which can be easily removed.

To this end my process broadly stated, consists in subjecting the material, while immersed in a liquid, to heat and pressure in a closed vessel such as an autoclave, whereby the layers and crystals are separated and the albuminoid or organic binder rendered soluble passes into solution in the liquid.

By this method, the separated layers or crystals are recovered with their natural pearly lustre, and such slight traces of organic matter as adhere thereto, if noticeable, may be removed by a suitable reagent.

The process is simple and inexpensive, and is characterized by the fact that large quantities of material may be treated in a relatively short period of operation.

Furthermore, this method is high in efficiency, since there is little or no loss of material incident to treatment and recovery, whereas in current practice, there is an enormous wastage of shell which could have been processed with my invention, and I have in mind, also the advantageous treatment of much waste stock heretofore considered valueless.

As a result of my treatment, the crystals and layers possessing their inherent brilliance and being substantially free from organic matter, may be used in many new applications, and very considerably enhance the beauty of articles in which pearl, mother of pearl or artificial mother of pearl are now employed.

It is therefore a further and important object of my invention to employ the flaked product in the manufacture of reconstructed pearls and mother of pearl, which may be accomplished by using a small quantity of artificial binder to replace the one removed, and building up layers of crystals after the manner of the natural formation.

It is another object of the invention to employ the crystals and layers in the decorative arts, and they may be incorporated in suitable plastics and liquid carriers. The removal of the objectionable organic matter renders the finely pulverized material available as a dentifrice, and it is therefore another object of my invention to combine the pure clean crystals with a suitable medicine or carrier for this purpose.

I also aim to improve the quality of the so-called "rayon" by incorporating the finely ground material in the cellulose or viscose, and extruding it in the usual manner to produce an artificial silk of excellent lustre and strength.

In addition to these applications, the invention may be used in the same manner as bronze and aluminum powders are now used in the arts, and it is an object of the invention to employ the crystal material as a decorative agent and filler in the manufacture of paper and paper products where it also improves the texture.

Bearing in mind, the nature of the material being treated, namely that the pearl, mother of pearl shell, nacre, and shells of mollusks in general are formed of layers of wafer-like crystals of calcium carbonate, with a small percentage, probably between 5% and 8% of organic matter, tenaciously binding or holding the crystals in a compact mosaic-like mass, I will describe in detail the process.

The material is first preferably cleansed of any loose or clinging particles such as are usually found attached to raw stock of this character.

Thereupon the stock is given a preliminary grinding, this being desirable from the standpoint of allowing the treatment to be more effective and rapid and also because a better flaking is had with small particles.

The material is now placed in a vessel which can be sealed or in which a pressure may be built up and maintained, such as an autoclave, and covered with water.

Heat is then applied to the autoclave until the desired temperature and pressure are reached, and this condition is maintained so long as tests of the material show the presence of any appreciable amounts of undissolved organic matter.

My invention contemplates, as will be understood, the breaking down of the natural formation with consequent separation of the layers and crystals and the extraction of the binder by rendering the albuminoid soluble under the conditions recited, namely in a bath with the mass subjected to the factors of heat and pressure. In this manner, the hot solvent will penetrate all of the interstices of the shell to thoroughly act upon the organic matter distributed therein, with the result that the major content of conchiolin or binder will pass into solution.

At this point, it will be understood that the treatment here described acts upon the binder to cause a breaking down or disintegration of the compact mosaic-like formation, and the separation of the crystals and layers. The conchiolin passes into solution leaving the flakes clean and lustrous and free from any of the effects of carbonization or burning.

When it has been ascertained that the mass of shell is substantially free of organic matter, the solution is run off and the shell recovered.

The shell so treated and recovered will be in the form of flakes, composed of crystals or layers of crystals. Since the major portion of the binder has been removed, it will be clear that the larger flakes may be readily mechanically separated or crushed to the desired sizes.

The product is finally purified by washing with water with or without the addition of chemicals to remove the last traces of the organic matter. Reagents such as sodium hydroxide, potassium hydroxide, ammonia and alcohol may be used for this purpose.

While I have expressed a preference for crushing the material prior to subjecting it to treatment in the autoclave, such preliminary crushing is not essential, since relatively large shell or pieces may be subjected to the treatment with equally good results.

It should also be understood that the size of the crystals or layers recovered may be controlled by an appropriate initial crushing of the material, and treating a batch of the uniform particles.

Aside from the advantage of initial grinding to obtain a final product of desired size, such crushing has the value of rendering the treatment more effective and rapid, since the more finely ground the particles, the greater the amount of shell and contained organic matter exposed to direct treatment. This principle, of course, is well understood.

In heating the immersed material and building up a pressure, I preferably start with a gentle heat until the mass has acquired a uniform temperature in order that particles close to the source of heat may not be discolored due to carbonization or charring of the organic matter caused by a too direct intense and rapid heating.

After the mass has acquired a uniform temperature the heat is increased until the desired degree and concomitant pressure are attained. Thereafter such conditions are maintained as long as necessary to accomplish a thorough extraction of the solvent matter.

I have conducted numerous tests to determine the proper temperature and pressure with various stock. These experiments show that at low temperatures and pressures excellent results are secured, but the time required for treatment is greater. With most shells, the higher the temperature and pressure, the more prompt is the breaking down or disintegration of the material, and the solvent action is likewise more rapid.

The pressure and temperature factors are, however, subject to the qualifications of the particular shell, namely, character, size and the specific composition of the conchiolin affecting its solubility.

The treatment is effective at a temperature substntially that of the boiling point of water, (100° C. more or less) and with normal atmospheric pressure (760 mm. more or less). Below these conditions there is some disintegration and solvent action but with a small temperature and pressure component treatment of any appreciable mass of material would be too slow.

For a rapid and complete treatment, a temperature varying from 184.5° C. to 215.5° C. and an accompanying pressure ranging between 10 and 20 atmospheres has been found satisfactory for a wide variety of materials. These computations are dependent upon the sizes and character of the pearl and shell and may be departed from as circumstances require.

For a great variety of materials I have found that crystals and layers free of organic matter except possible slight adhering traces may be obtained by processing the material for about two hours at 184.5° C. and 10 atmospheres. This is an average computed upon the basis of numerous tests.

I have referred to water as the medium for affecting solution of the conchiolin under the conditions of heat and pressure, but it will be understood that other liquids may be used. However, water is inexpensive and does not exert a chemical action on the material, hence its value. Wherever, other liquids or solvents are used care should be exercised to employ one which will be inert so far as the calcium carbonate crystals are concerned.

After the treatment and final washing of the recovered material, the flakes and layers may be graded to obtain uniform sizes. Such a separation of sizes may be made by suspension in water or any other suitable liquid. The larger layers or flakes if not required may be reduced to smaller sizes by running in a ball mill or by using an impact crusher, it being understood that removal of the conchiolin or natural binder renders the shell or pearl brittle and hence capable of easy flaking.

It will be observed that in addition to the temperature, pressure and solvent components, a further factor assists my process. Where the material is immersed in water and heated and particularly when the water is boiling, there occurs the usual agitation or churning incident to rising of the warmer and lighter water and the passing downward of the cooler and heavier liquid. This sets up a number of currents serving to keep the material in a state of agitation constantly churning it and presenting its different surfaces to different portions of the solvent. By so exposing the different portions of the material to the solvent, the treatment is rendered effective and rapid and carbonization and burning are prevented, since the temperature to which the particles are subjected will be substantially constant.

There are, of course, some insoluble substances present and by the treatment here disclosed these are almost entirely dislodged or disintegrated as the conchiolin goes into solution, and such insoluble matter either passes into suspension or forms as a precipitate in the bath.

To recapitulate my invention relates to the treatment of pearl, mother of pearl shell, nacre and the shells of mollusks in general and consists in subjecting these materials to heat and pressure while contained in a closed vessel such as an autoclave and covered with a suitable liquid.

There results a breaking down or disintegration of the natural mosaic like formation and separation of the crystals and layers due to the effect of the treatment upon the binder. The major portion of the organic matter is rendered soluble and any dislodged insoluble particles form as a suspension or precipitate.

The recovered crystals or layers of crystals retain their natural polish and lustre and show no evidence of discoloration such as occurs when the organic matter becomes cooked, carbonized or burned. They may be easily treated when necessary to remove adhering matter and after being crushed when required are then ready for use.

The application of the flaked product to the making of reconstructed pearls and mother of pearl has been achieved with excellent results. The method simulates closely that of the pearl or mollusk and the final product possesses a beauty so nearly resembling the natural object that it is not easily distinguished.

For example by taking the flakes of the present invention from which the conchiolin has been removed, and reducing them to desired size, I am able, with the aid of a small quantity of a suitable binder replacing that removed, to apply the material as a coating with or without pressure to various objects.

For instance, I may produce pearls and pearly articles by building up successive layers upon a small object after the manner of the pearl oyster, which in the case of a natural pearl, starts from a small body in the center and covers it with layers until the pearl is made up somewhat like the growth of an onion. The pearl made with my invention, using an artificial binder, has an equal lustre over its entire surface as is characteristic of the natural object.

Of course, I may build up upon small or large articles, or apply a single layer or film, and I may also mold or cast an article from the mass of the flakes and binder.

After the article has been suitably coated or shaped and pressed to the preferred compact form, it may be allowed to set, or heat and cold may be applied, all dependent upon the binder employed which it is desired to harden.

Various binders may be used to replace the conchiolin, for instance gelatin, casein, isinglass, synthetic resins, cellulose products, shellacs, rubber, gums, silicates, organic glass, agar agar and other suitable materials.

It will also be understood that mother of pearl may likewise be duplicated by simply building up layers of flakes coated with a small amount of one of the above mentioned binders, and suitably pressing to exude any superfluous material and form a compact mass.

The pearl and mother of pearl formed from the natural flakes and artificial binder as well as other articles, exhibit the pearly lustre so characteristic of the natural objects which is due primarily to the excellent polish retained in the recovered crystals and to the fact that their arrangement in the manufactured product approaches closely the natural mosaic formation.

By way of explaining the advantage of my invention over previous expedients, in the case of mother of pearl, the shells grow in layers like the pages of a book and if such shells be merely mechanically reduced without eliminating the organic binder, the resultant product shows but little lustre. This is because the material breaks up into cubes and blocks and the edges of a cube of mother of pearl would show no lustre, only the top and bottom showing the pearly brilliance. When the blocks or cubes so obtained are applied in use, obviously this defect in their lustre is very noticeable.

The value of my process becomes apparent therefore since the wafer-like crystals have their natural polish, and the reconstructed articles then become difficult to discern from the genuine, since the arrangement of layers is substantially the same.

This method of reassembling the flakes is likewise important in the manufacture of pearl buttons and all kinds of pearl articles. For example present methods requiring cutting and machining processes are expensive and the waste is enormous.

The flakes recovered by my process, in which there is little or no waste, can be finely pulverized and then molded with a suitable binder into various forms of buttons and pearl novelties. The saving is tremendous and the resulting product is even superior to the natural one, as color may be added or removed to give a variety of novel effects.

It should be borne in mind that my process contemplates an advantageous treatment of great quantities of material now ordinarily wasted. Thus in factories where the raw stock is cut and machined, a new field is open for the manufacture of valuable articles by utilizing the miscellaneous cuttings and scrap.

The flakes for instance can be incorporated in moldable compositions such as casein plastics, bakelite, gelatin, agar agar and cellulose with very striking and attractive results. Such compositions may be shaped in a variety of forms as is well known.

It will therefore be seen that by flaking the material in accordance with my process, and molding after incorporating a suitable binder, I can by means of a hydraulic press, make the desired object without waste of material and eliminate the present crude, expensive and wasteful methods.

The flakes or crystals in pulverulent form may be incorporated in paints, varnishes, lacquers and ornamental coatings of various characters. In the same manner, a clear vehicle having adhesive properties may be employed giving a delightful pearly effect.

Another use for the flakes or crystals is in the manufacture of a dentifrice. Tooth pastes and powders using mother of pearl have been unsatisfactory, due to the presence of the organic matter. Since by my process this objection has been overcome, the clean pure flakes may be easily reduced to a fine powder and used dry with some medicinal agent, or the powder may be formed into a paste with glycerine or glycerite of starch as a vehicle. The dentifrices so provided containing the pure calcium carbonate crystals can have no deleterious effect on the teeth.

The manufacture of artificial silk or "rayon" by the extrusion of viscose and cellulose compositions has become increasingly important. I have found that by incorporating the pulverulent crystals of my invention in the composition, the threads produced have an excellent strength and lustre.

The finely pulverized flakes provide a desirable filler for paper and impart to it a sheen as well as serve to strengthen the texture. The powder may be added to the pulp in the beater or sprinkled upon the Fourdrinier.

In the case of wall paper, the pulverulent material may be incorporated in the pulp and may be sprinkled upon the paper in adhesive condition or the paper provided with a light adhesive coating.

The flakes may be used in the arts after the same manner as aluminum and bronze powders, being ground to pass through a 300 mesh or finer screen as desired.

It will therefore be seen that with my process, a clear pure pigment of finely ground calcium carbonate crystals can be produced, and while I have set forth several novel applications, I do not mean to be limited to these in the appended claims, since the product may be used in many arts not specifically mentioned.

In referring to nacreous materials in the appended claims, it will be understood that this term is used to include pearl, mother of pearl shell, nacre, and the shells of mollusks as well as various similar formations.

I claim:

1. The process of treating nacreous materials having the form of crystalline layers united by a natural binder, which consists in immersing the material in water and subjecting it in a closed chamber to a temperature above 100° C. and a pressure above that of the atmosphere to dissolve the natural binder, and recovering the separated layers.

2. The process of treating laminated nacreous material to recover the natural flakes and crystals thereof, which comprises heating the material under pressure while immersed in a liquid solvent for the binder until the binder is dissolved, and recovering the free flakes and crystals in lustrous condition and in substantially their natural form freed of the binder.

3. The process of treating laminated nacreous material to recover the natural flakes and crystals thereof, which comprises heating the material to a temperature up to substantially 215.5° C. and under a pressure up to 20 atmospheres while immersed in a liquid solvent for the binder until the binder is dissolved, and recovering the free flakes and crystals in lustrous condition and in substantially their natural form freed of the binder.

4. As a new article of manufacture, a laminæ of unbound nacreous flakes and crystals substantially freed from the organic natural binder and possessing their natural form and lustrousness.

In testimony whereof I have hereunto set my hand.

GEORGE A. LIPPINCOTT.